(12) United States Patent
Qin et al.

(10) Patent No.: US 10,879,774 B2
(45) Date of Patent: Dec. 29, 2020

(54) ELECTRIC POWER STEERING SYSTEM AND BRUSH MOTOR THEREOF

(71) Applicant: Johnson Electric S.A., Murten (CH)

(72) Inventors: Rui Feng Qin, Hong Kong (CN); Fei Liu, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 376 days.

(21) Appl. No.: 15/696,744

(22) Filed: Sep. 6, 2017

(65) Prior Publication Data

US 2018/0076697 A1 Mar. 15, 2018

(30) Foreign Application Priority Data

Sep. 9, 2016 (CN) .......................... 2016 1 0814495

(51) Int. Cl.
| | |
|---|---|
| *H02K 13/04* | (2006.01) |
| *H02K 1/26* | (2006.01) |
| *H02K 3/28* | (2006.01) |
| *H02K 3/48* | (2006.01) |
| *H02K 13/10* | (2006.01) |

(52) U.S. Cl.
CPC ............ *H02K 13/04* (2013.01); *H02K 1/265* (2013.01); *H02K 3/28* (2013.01); *H02K 3/48* (2013.01); *H02K 13/10* (2013.01)

(58) Field of Classification Search
CPC .......... H02K 13/04; H02K 1/265; H02K 3/28; H02K 3/48; H02K 13/10
See application file for complete search history.

(56) References Cited

U.S. PATENT DOCUMENTS

| 7,834,491 | B2* | 11/2010 | Huan | H02K 13/006 |
| | | | | 310/233 |
| 8,911,221 | B2* | 12/2014 | Cheng | F04D 25/082 |
| | | | | 310/198 |
| 2006/0055271 | A1* | 3/2006 | Kaneko | H02K 1/17 |
| | | | | 310/208 |
| 2011/0012470 | A1* | 1/2011 | Li | H02K 23/34 |
| | | | | 310/195 |
| 2014/0167553 | A1* | 6/2014 | Li | H02K 23/28 |
| | | | | 310/177 |
| 2017/0133905 | A1* | 5/2017 | Nakamura | H02K 29/12 |

* cited by examiner

*Primary Examiner* — Thienvu V Tran
*Assistant Examiner* — Bart Iliya
(74) *Attorney, Agent, or Firm* — Muncy, Geissler, Olds & Lowe, P.C.

(57) ABSTRACT

An electric power steering system and its brush motor are disclosed. The brush motor includes a stator and a rotor rotatably mounted to the stator. The rotor includes a rotary shaft, a commutator and a rotor core fixed to the rotary shaft, and a rotor winding wound around the rotor core. The commutator includes a plurality of commutator segments. The rotor core includes a plurality of teeth. The rotor winding includes a plurality of winding elements. Adjacent teeth define therebetween wire slots for receiving the winding elements. The winding elements include a plurality of first winding elements and a plurality of second winding elements. The first winding elements are connected in series through the commutator segments. The second winding elements are connected in series through the commutator segments. The first winding elements and the second winding elements are received in different wire slots. Implementation of the present invention can improve the reliability of the product.

15 Claims, 15 Drawing Sheets

ELECTRIC POWER STEERING SYSTEM AND BRUSH MOTOR THEREOF

CROSS REFERENCE TO RELATED APPLICATIONS

This non-provisional patent application claims priority under 35 U.S.C. § 119(a) from Patent Application No. 201610814495.0 filed in The People's Republic of China on Sep. 9, 2016.

FIELD OF THE INVENTION

This invention relates to the field of motors, and in particular to a brush motor and an electric power steering system employing the brush motor.

BACKGROUND OF THE INVENTION

An electric power steering system, such as an electric power steering system of a car steering wheel, employs a motor as a power source. The motor of this type is usually a brush motor, a motor rotor of which includes a rotary shaft, a commutator fixed to the rotary shaft, a rotor core fixed to the rotary shaft, and a rotor winding wound around teeth of the rotor core and electrically connected to commutator segments of the commutator. A conventional rotor winding is formed by simplex lap winding. In case an certain winding element is broken, performance of the motor may degrade significantly, which causes the assisting force to decrease greatly, thereby seriously affecting the reliability and safety of the electric power steering system.

SUMMARY OF THE INVENTION

Thus, there is a desire for an improved brush motor and an electric power steering system employing the brush motor.

In a first aspect, the present invention provides a brush motor including a stator and a rotor rotatably mounted to the stator. The stator includes a plurality of electric brushes. The rotor comprises a rotary shaft, a commutator and a rotor core fixed to the rotary shaft, and a rotor winding wound around the rotor core. The commutator comprises a plurality of commutator segments. The rotor core comprises a plurality of teeth. The rotor winding comprises a plurality of winding elements. Adjacent teeth define therebetween wire slots for receiving the winding elements. The winding elements include a plurality of first winding elements and a plurality of second winding elements. The first winding elements are connected in series through the commutator segments. The second winding elements are connected in series through the commutator segments. Each of the first winding elements be not electrically connected with any of the second winding elements when the electric brush being not contacting with the commutator segments, The first winding elements and the second winding elements are received in different wire slots.

Preferably, for any two adjacent wire slots, one wire slot is configured to receive one of the first winding elements, and the other wire slot is configured to receive one of the second winding elements.

Preferably, for any two adjacent commutator segments, one commutator segment is electrically connected with one of the first winding elements, and the other commutator segment is electrically connected with one of the second winding elements.

Preferably, the first winding elements are formed by continuously winding a single wire, and the second winding elements are formed by continuously winding a single wire.

Preferably, the number of the commutator segments of the commutator is an even number, and the number of the teeth of the rotor core is an even number.

Preferably, the number of the commutator segments is equal to the number of the teeth.

Preferably, a span length of the winding element is an even number.

Preferably, in various winding elements formed by winding the same wire, adjacent ones are offset by two wire slots along a circumferential direction of the rotor and by two commutator segments along the circumferential direction of the rotor.

Preferably, each winding element has a span length, a difference between the span length and a pole pitch calculated in terms of the number of the teeth of the rotor is no greater than 1, and two leading-out ends of each winding element are directly connected to two of the commutator segments, respectively.

Preferably, two leading-out ends of each winding element are directly connected to two of the commutator segments, and a difference between a commutator pitch of each winding element and two times of a pole pitch calculated in terms of the number of the commutator segments is no greater than 2.

Preferably, two leading-out ends of each winding element are directly connected to two of the commutator segments, and a difference between a commutator pitch of each winding element and two times of a pole pitch calculated in terms of the number of the commutator segments is no greater than 2.

Preferably, the difference between the commutator pitch of each winding element and two times of the pole pitch calculated in terms of the number of the commutator segments is equal to 1.

Preferably, the commutator segments are evenly arranged along a circumferential direction of the commutator, with a spacing formed between adjacent two commutator segments, the stator comprises a plurality of electric brushes in contact with the commutator segments of the commutator, a size of each electric brush in a circumferential direction of the commutator is configured to enable the electric brush to at least contact two adjacent commutator segments at any given time.

Preferably, the stator has 4 stator poles, the number of the commutator segments is 22, and the number of the wire slots is 22.

Preferably, the stator has 4 stator poles, the number of the commutator segments is 18, and the number of the wire slots is 18.

Preferably, the stator has 4 stator poles, the number of the commutator segments is 14, and the number of the wire slots is 14.

Preferably, the stator has 6 stator poles, the number of the commutator segments is 20, and the number of the wire slots is 20.

In another aspect, the present invention provides an electric power steering system comprising a torque sensor, an electronic control unit as well as the brush motor as described above. The brush motor is configured as an assisting motor under the control of the electronic control unit.

By implementing the present invention, winding elements in two adjacent wire slots of the motor belong to different closed loops, which enhances the reliability of the motor and hence enhances the reliability of the products.

BRIEF DESCRIPTION OF THE DRAWINGS

Advantages and implementations of the present invention will become more apparent by consideration of the embodiments described below with reference to the drawings. It should be noted that the figures are illustrative rather than limiting. In the drawings.

DETAILED DESCRIPTION OF THE PREFERRED EMBODIMENTS

Figure 1:
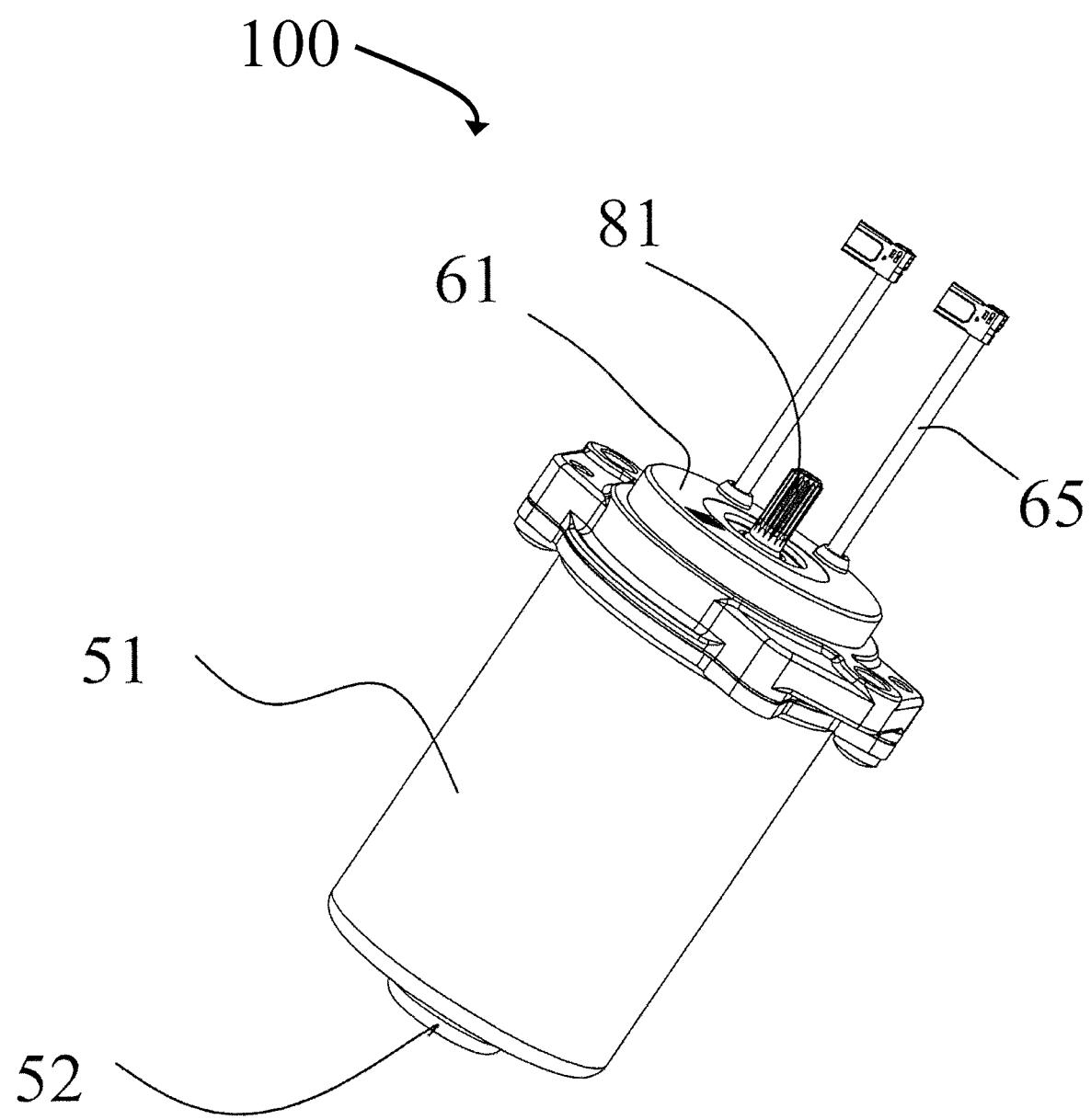
FIG. 1 illustrates a brush motor according to a first embodiment of the present invention.
Figure 2:
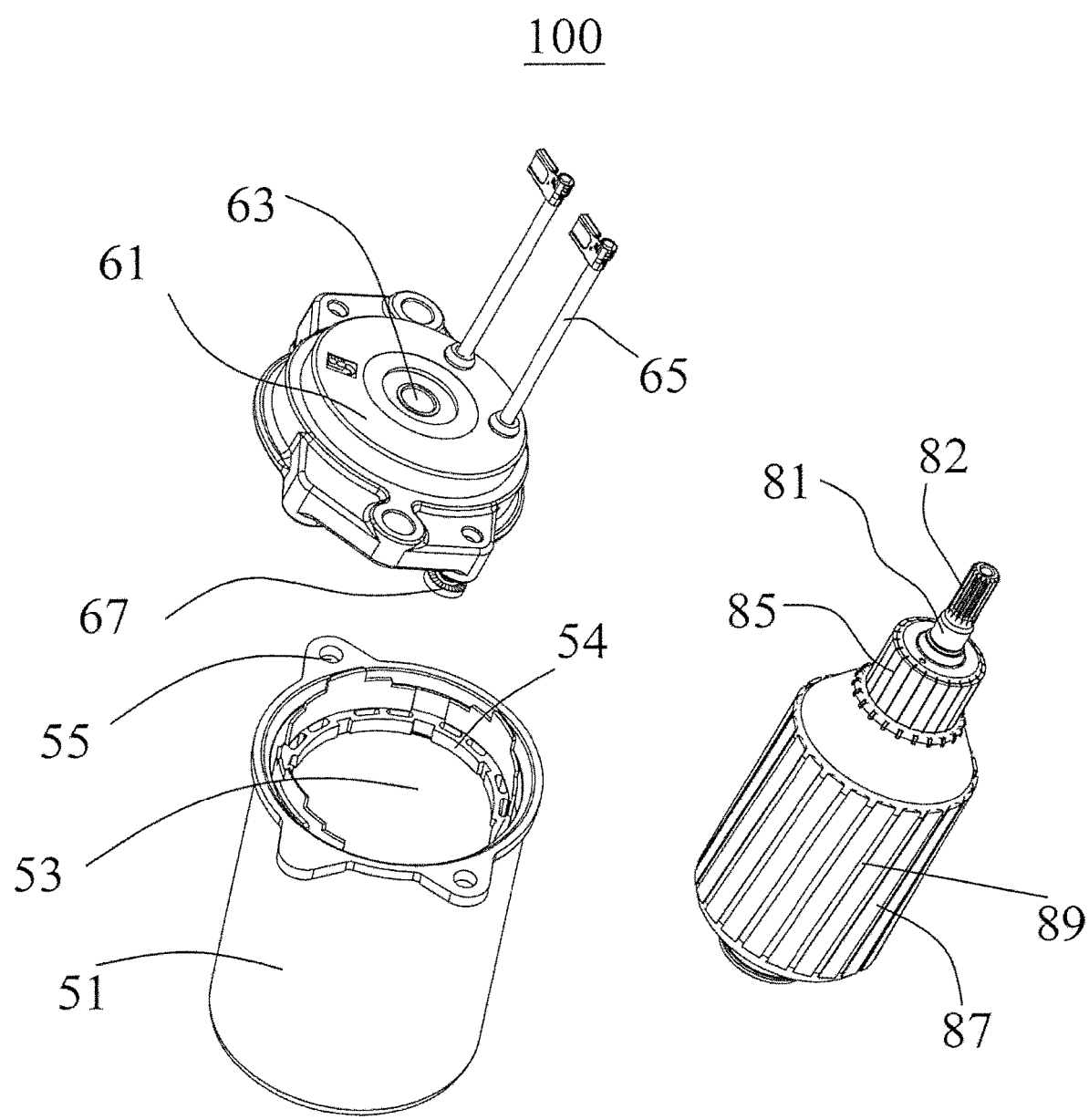
FIG. 2 is an exploded view of the brush motor of FIG. 1.

Referring to FIG. 1 and FIG. 2, a motor 100 in accordance with one embodiment of the present invention is a direct current brush motor, which includes a stator and a rotor. The stator includes an outer housing 51 opened at one end thereof, an abutting ring 53 mounted to an inner surface of the outer housing 51, permanent magnets (not shown) held between the outer housing 51 and the abutting ring 53, and an endcap 61 mounted to the open end of the outer housing 51. In this embodiment, a flange at the open end of the outer housing 51 is formed with through holes 55 for allowing screws 67 to pass therethrough. The screws 67 are threaded into the endcap 61 to fix the endcap 61 and the outer housing 51 together. In this embodiment, the permanent magnets are mounted to a magnet mounting bracket 54. The magnet mounting bracket 54 includes two parallel ring bodies and a plurality of parallel connecting rods connected between the two ring bodies. Each permanent magnet is disposed between two connecting rods. The permanent magnets and the magnet mounting bracket 54 together are held between the outer housing 51 and the abutting ring 53. The abutting ring 53 is formed by rolling a spring sheet into a ring shape, for preventing the permanent magnets from falling off the outer housing 51.

The rotor includes a rotary shaft 81, a commutator 85 and a rotor core 87 coaxially fixed to the rotary shaft 81, and a rotary winding 89 wound around the rotary core 87. The rotor is mounted within the outer housing 51, with the rotary shaft 81 supported by a bearing (not shown) mounted at a bottom 51 of the outer housing 51 and a bearing (not shown) mounted in the endcap 61, making the rotor rotatable relative to the stator. A center of the endcap 61 defines a through hole 63 for allowing the rotary shaft 81 to extend out, and the extending-out end of the rotary shaft 81 includes or is mounted with a gear shaft 82 for driving an external member.

Figure 3:
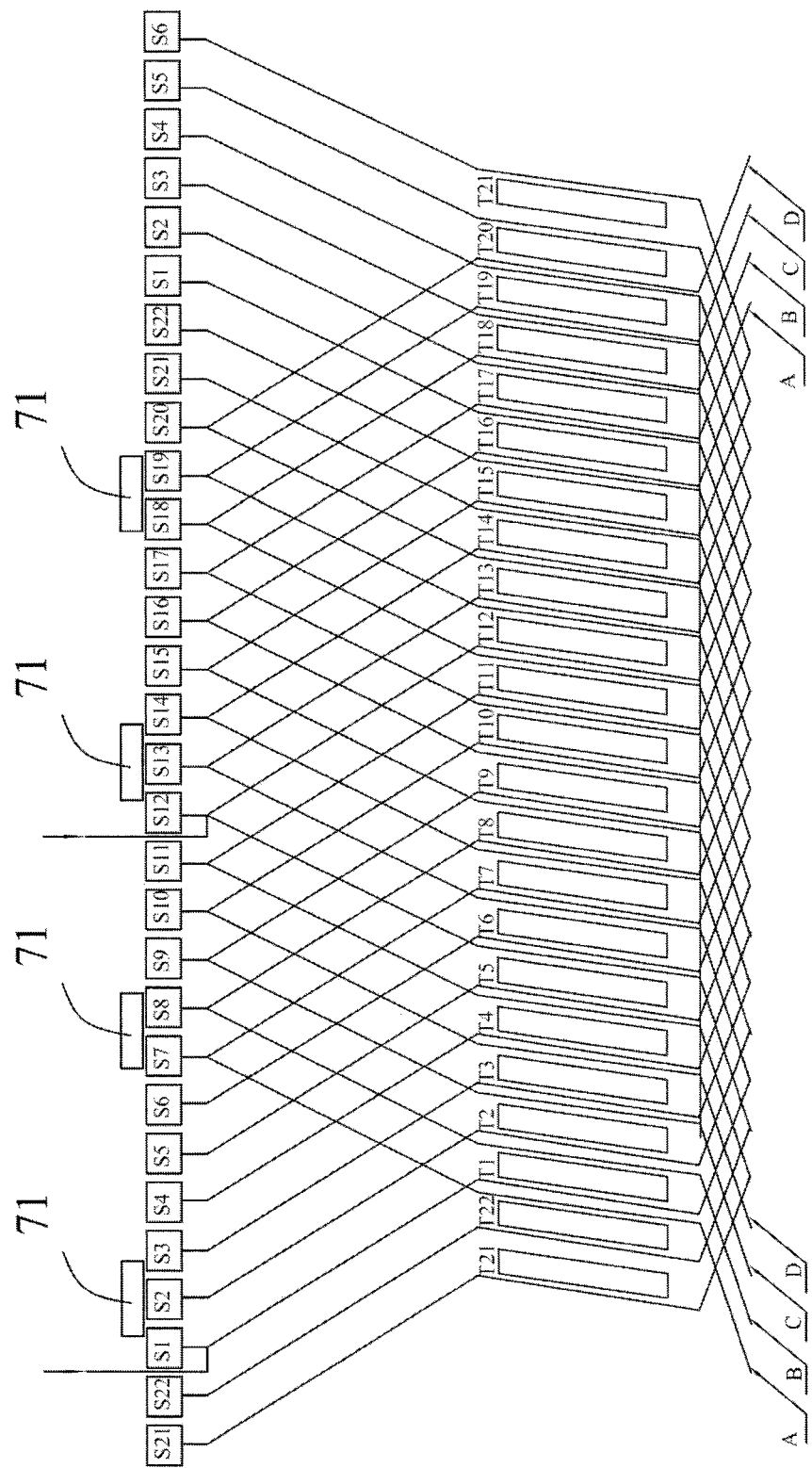
FIG. 3 is an unrolled view of a rotor winding of the motor of FIG. 1.

Referring also to FIG. 3, the commutator 85 includes an insulating base and a plurality of commutator segments S1-S22 fixed to the insulating base. The rotor core 87 includes a plurality of teeth extending outwardly along an axial direction of the motor, with wire slots formed between adjacent teeth. The rotor winding 89 includes a plurality of winding elements each formed by winding a wire a plurality of turns around corresponding teeth. Effective sides of the winding elements are disposed in respective wire slots, respectively, and wire ends of the winding elements are electrically connected with the commutator segments. The endcap 61 is mounted with electric brushes 71 in contact with the commutator segments such that electric power is supplied to the rotor winding 89 through the electric brushes 71.

FIG. 3 is an unrolled view of the rotor winding 89. In this embodiment, the stator has four stator poles, the endcap 61 is mounted with four electric brushes, and the commutator 85 has twenty-two commutator segments S1 to S22. In this disclosure, the commutator segments S1, S3, S5 or the like denoted by odd numbers are referred to as odd-numbered commutator segments, while the commutator segments S2, S4, S6 or the like denoted by even numbers are referred to as even-numbered commutator segments. The rotor core 87 has twenty-two teeth T1 to T22 which define a total of twenty-two wire slots. In this disclosure, the teeth T1, T3, T5 or the like denoted by odd numbers are referred to as odd-numbered teeth, while the teeth T2, T4, T6 or the like denoted by even numbers are referred to as even-numbered teeth; the wire slots at left sides of the odd-numbered teeth are referred to as odd-numbered wire slots, while the wire slots at left sides of the even-numbered teeth are referred to as even-numbered wire slots.

In FIG. 3, the first row shows the four electric brushes 71 of the motor, the second row shows the twenty-two commutator segments S1 to S22, and the third row shows the twenty-two teeth T1 to T22. For the purpose of clearer showing of the rotor winding, FIG. 3 duplicately shows eight commutator segments, i.e. the commutator segments S21, S22, S1 to S6 at the right side of the first row.

According to the definition of the motor pole pitch, the pole pitch of this motor is 22/4, i.e. 5.5 teeth or wire slots if calculated in terms of the number of the rotor teeth or wire slots, and is 22/4, i.e. 5.5 commutator segments if calculated in terms of the number of the commutator segments.

The winding illustrated in FIG. 3 is formed by winding two wires. For the sake of easy illustration, this disclosure uses FIG. 4 and FIG. 5 to show the unrolled views of the two wires, respectively.

Figure 4:
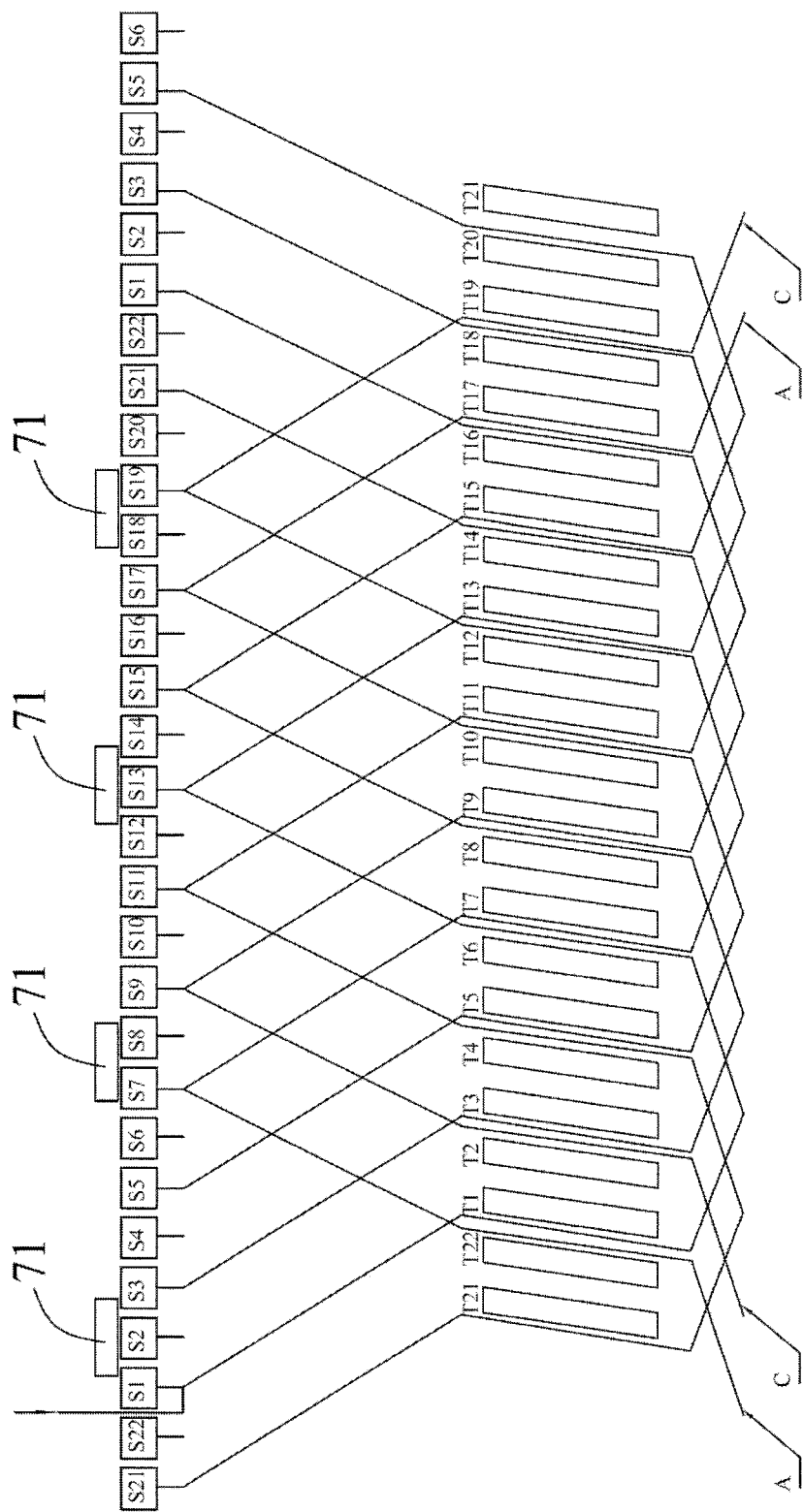
FIG. 4 is a view showing the winding process of first winding elements of the rotor winding of FIG. 3.

Referring to FIG. 4, the first wire is first hooked on one odd-numbered commutator segment S1. The first wire extends out of the commutator segment S1 into the wire slot between the teeth T22 and T1, is wound a plurality of turns around the teeth T1 to T6 to thereby form one winding element, and is then hooked on the commutator segment S13. Next, the first wire extends out of the commutator segment S13 into the wire slot between the teeth T12 and T13, is wound a plurality of turns around the teeth T13 to T18 to thereby form another winding element, and is then hooked on the commutator segment S3. The winding process may be shown in the table below.

TABLE 1

Winding and Hooking of Wires of Two Winding elements

| Commutator Segment (Hooked) | Group of Teeth Being Wound | Commutator Segment (Hooked) | Group of Teeth Being Wound | Commutator Segment (Hooked) |
|---|---|---|---|---|
| S1 | T1~T6 | S13 | T13~T18 | S3 |

Next, the first wire extends out of the commutator segment S3 into the wire slot between the teeth T2 and T3, is wound a plurality of turns around the teeth T3 to T8 to thereby form one winding element, and is then hooked on the commutator segment S15. Next, the first wire extends out of the commutator segment S15 into the wire slot between the teeth T14 and T15, is wound a plurality of turns around the teeth T15 to T20 to thereby form another winding element, and is then hooked on the commutator segment S5. The winding process may be shown in the table below.

TABLE 2

Winding and Hooking of Wires of Next Two Winding elements

| Commutator Segment (Hooked) | Group of Teeth Being Wound | Commutator Segment (Hooked) | Group of Teeth Being Wound | Commutator Segment (Hooked) |
|---|---|---|---|---|
| S3 | T3~T8 | S15 | T15~T20 | S5 |

Similarly, after extending out of the commutator segment S5, the first wire is wound a plurality of turns around the group of teeth T5 to T10 to form one winding element and then hooked on the commutator segment S17. After extending out of the commutator segment S17, the first wire is wound a plurality of turns around the group of teeth T17 to T22 to form one winding element and then hooked on the commutator segment S7. After extending out of the commutator segment S7, the first wire is wound a plurality of turns around the group of teeth T7 to T12 to form one winding element and then hooked on the commutator segment S19. After extending out of the commutator segment S19, the first wire is wound a plurality of turns around the group of teeth T19 to T2 to form one winding element and then hooked on the commutator segment S9. After extending out of the commutator segment S9, the first wire is wound a plurality of turns around the group of teeth T9 to T14 to form one winding element and then hooked on the commutator segment S21. After extending out of the commutator segment S21, the first wire is wound a plurality of turns around the group of teeth T21 to T4 to form one winding element and then hooked on the commutator segment S11. After extending out of the commutator segment S11, the first wire is wound a plurality of turns around the group of teeth T11 to T16 to form one winding element and then hooked on the commutator segment S21, thereby forming a closed loop. The winding and hooking of this wire is shown as follows.

TABLE 3

Winding and Hooking of The First Wire

| Commutator Segment (Hooked) | Group of Teeth Being Wound | Commutator Segment (Hooked) | Group of Teeth Being Wound | Commutator Segment (Hooked) |
|---|---|---|---|---|
| S1 | T1~T6 | S13 | T13~T18 | S3 |
| S3 | T3~T8 | S15 | T15~T20 | S5 |
| S5 | T5~T10 | S17 | T17~T22 | S7 |
| S7 | T7~T12 | S19 | T19~T2 | S9 |
| S9 | T9~T14 | S21 | T21~T4 | S11 |
| S11 | T11~T16 | S1 | | |

The first wire is wound to form a total of eleven winding elements, and the number of the winding elements is a half of the number of the commutator segments or teeth. The winding direction of each winding element is the same, i.e. each in the clockwise direction or the counterclockwise direction. Each winding element extends around six teeth (or six wire slots). Therefore, if calculated in terms of the tooth number or the wire slot number, each winding element has a span length of six, which is 0.5 greater than the pole pitch. The difference between the span length and the pole pitch is no greater than 1, so that there are as many magnetic fluxes as possible passing through the winding element. If calculated in terms of the number of the commutator segments, the pole pitch of the motor is 5.5, i.e. 5.5 commutator segments. The commutator pitch of each winding element (the distance in the circumferential direction of the commutator between two commutator segments connected by two leading-out ends of each winding element) is 12 or 10 (calculated in two circumferential directions of the commutator). For example, the commutator pitch of the winding element that is hooked on the commutator segments S1 and S13 is 12 or 10 (calculated in two circumferential directions of the commutator), which is 1 greater or less than two times of the pole pitch.

As can be seen from FIG. 4, the odd-numbered commutator segments, such as S1, S3, S5 or the like, are all directly connected to the first wire, while neither of the even-numbered commutator segments, such as S2, S4, S6 or the like, is directly connected to the first wire. The winding elements wound by the first wire are all disposed in the odd-numbered wire slots, such as in the wire slots at the left sides of the teeth T1, T3, T5 or the like. Therefore, the span lengths of the winding elements calculated in terms of the wire slot number are all even numbers. All winding elements in the odd-numbered wire slots are connected in series through the corresponding odd-numbered commutator segments to form a closed loop.

As can be seen from FIG. 4, of the winding elements wound by the first wire, two adjacent winding elements are offset by two wire slots and also by two commutator segments. For example, the winding element connected to the commutator segments S1, S13 extends around the group of teeth T1 to T6, and the winding element connected to the commutator segments S3, S15 extends around the group of teeth T3 to T8.

Figure 5:
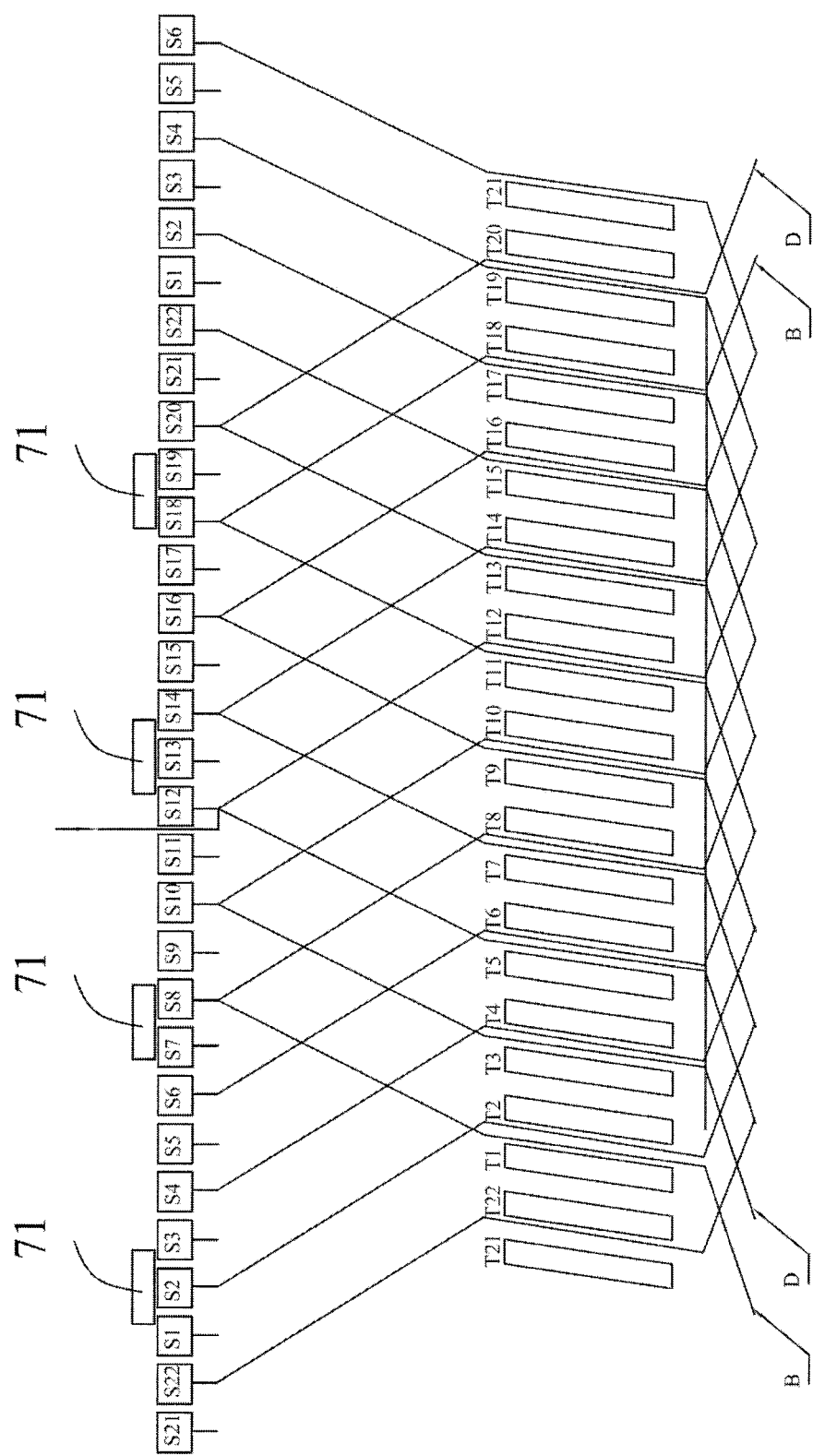
FIG. 5 is a view showing the winding process of second winding elements of the rotor winding of FIG. 3.

Referring to FIG. 5, the second wire is first hooked on one even-numbered commutator segment, such as the commutator segment S12. The second wire extends out of the commutator segment S12 into the wire slot between the teeth T11 and T12, is wound a plurality of turns around the teeth T12 to T17 to thereby form one winding element, and is then hooked on the commutator segment S2. Next, the second wire extends out of the commutator segment S2 into the wire slot between the teeth T1 and T2, is wound a plurality of turns around the teeth T2 to T7 to thereby form another winding element, and is then hooked on the commutator segment S14. Subsequent winding process is similar to that described above, explanation of which is therefore not repeated herein. The winding and hooking of this second wire is shown as follows.

TABLE 4

Winding and Hooking of The Second Wire

| Commutator Segment (Hooked) | Group of Teeth Being Wound | Commutator Segment (Hooked) | Group of Teeth Being Wound | Commutator Segment (Hooked) |
|---|---|---|---|---|
| S12 | T12~T17 | S2 | T2~T7 | S14 |
| S14 | T14~T19 | S4 | T4~T9 | S16 |
| S16 | T16~T21 | S6 | T6~T11 | S18 |
| S18 | T18~T1 | S8 | T8~T13 | S20 |
| S20 | T20~T3 | S10 | T10~T15 | S22 |
| S22 | T22~T5 | S12 | | |

The second wire is wound to form a total of eleven winding elements, and the number of the winding elements is a half of the number of the commutator segments or teeth. The winding direction of each winding element is the same, i.e. each in the clockwise direction or the counterclockwise direction. Each winding element extends around six teeth (or six wire slots). Therefore, if calculated in terms of the tooth number or the wire slot number, each winding element has a span length of six, which is 0.5 greater than the pole pitch. The difference between the span length and the pole pitch is no greater than 1, so that there are as many magnetic fluxes as possible passing through the winding element. If calculated in terms of the number of the commutator segments, the pole pitch of the motor is 5.5, i.e. 5.5 commutator segments. The commutator pitch of each winding element is 12 or 10 (calculated in two circumferential directions of the commutator), which is 1 greater or less than two times of the pole pitch.

As can be seen from FIG. 5, the even-numbered commutator segments, such as S2, S4, S6 or the like, are all directly connected to the second wire, while neither of the odd-numbered commutator segments, such as S1, S3, S5 or the like, is directly connected to the second wire. The winding elements wound by the second wire are all disposed in the even-numbered wire slots, such as in the wire slots at the left sides of the teeth T2, T4, T6 or the like. Therefore, the span lengths of the winding elements calculated in terms of the wire slot number are all even numbers. All winding elements in the even-numbered wire slots are connected in series through the corresponding even-numbered commutator segments to form a closed loop.

As can be seen from FIG. 5, of the winding elements wound by the second wire, two adjacent winding elements are offset by two wire slots and also by two commutator segments. For example, the winding element connected to the commutator segments S2, S14 extends around the group of teeth T2 to T7, and the winding element connected to the commutator segments S7, S16 extends around the group of teeth T4 to T9. After the windings of FIG. 4 and FIG. 5 are combined, the rotor winding 89 illustrated in FIG. 3 is thus obtained. The rotor winding 89 is formed by winding two wires. A single-fork winding machine can be used to first wind one wire and then wind the other wire. Alternatively, a double-fork winding machine can be used to wind the two wires at the same time, in which case the initial hook positions of the two wires are preferably two opposed positions of the commutator 85.

In summary, the rotor winding 89 has twenty-two winding elements, and the number of the winding elements is the same as the number of the commutator segments or the teeth. All winding elements disposed in the odd-numbered wire slots are connected in series directly or physically through only the commutator segments to form a closed loop. Preferably, all winding elements disposed in the odd-numbered wire slots are formed by continuously winding the first wire. All winding elements disposed in the even-numbered wire slots are connected in series directly or physically through only the commutator segments to form a closed loop. Preferably, all winding elements disposed in the even-numbered wire slots are formed by continuously winding the second wire. As such, even if the wire in a certain wire slot is broken, the number of the affected winding element occupies a small ratio of the total winding elements and hence the motor performance is less affected. Therefore, this type of motor is suitable for applications requiring a high level of reliability, such as used in the vehicle electric power steering system as an assisting motor.

In other words, the motor winding of this embodiment includes two independent first winding and second winding. The first winding includes a plurality of first winding elements (i.e. the winding elements in the odd-numbered wire slots) connected in series through the commutator segments to form a first closed loop. The second winding includes a plurality of second winding elements (i.e. the winding elements in the even-numbered wire slots) connected in series through the commutator segments to form a second closed loop. The first closed loop and the second closed loop are not electrically connected if there is no electric brush. In cooperation with the electric brushes, the first closed loop and the second closed loop are electrically connected in parallel.

As shown in FIG. 3 to FIG. 5, two adjacent commutator segments has a spacing therebetween. Preferably, a size of each electric brush 71 along a circumferential direction of the commutator 85 is greater than a sum of a size of one commutator segment in the circumferential direction of the commutator 85 and a width of the spacing, to enable the electric brush 71 to contact two commutator segments at any time, such that the first winding and the second winding can work at the same time, thereby ensuring the efficiency of the motor.

Figure 6:
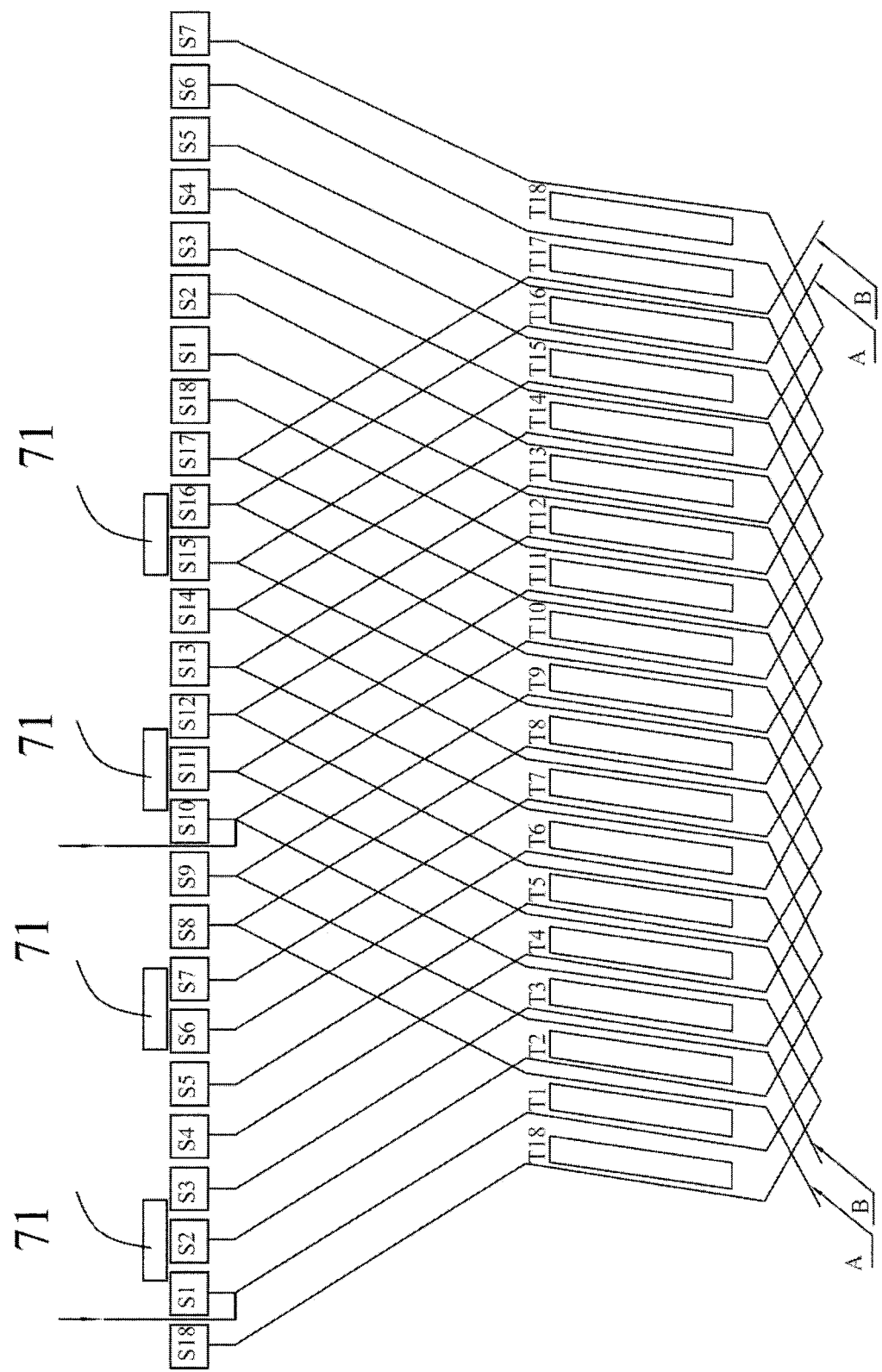
FIG. 6 is an unrolled view of a rotor winding of a motor according to a second embodiment of the present invention.
Figure 7:
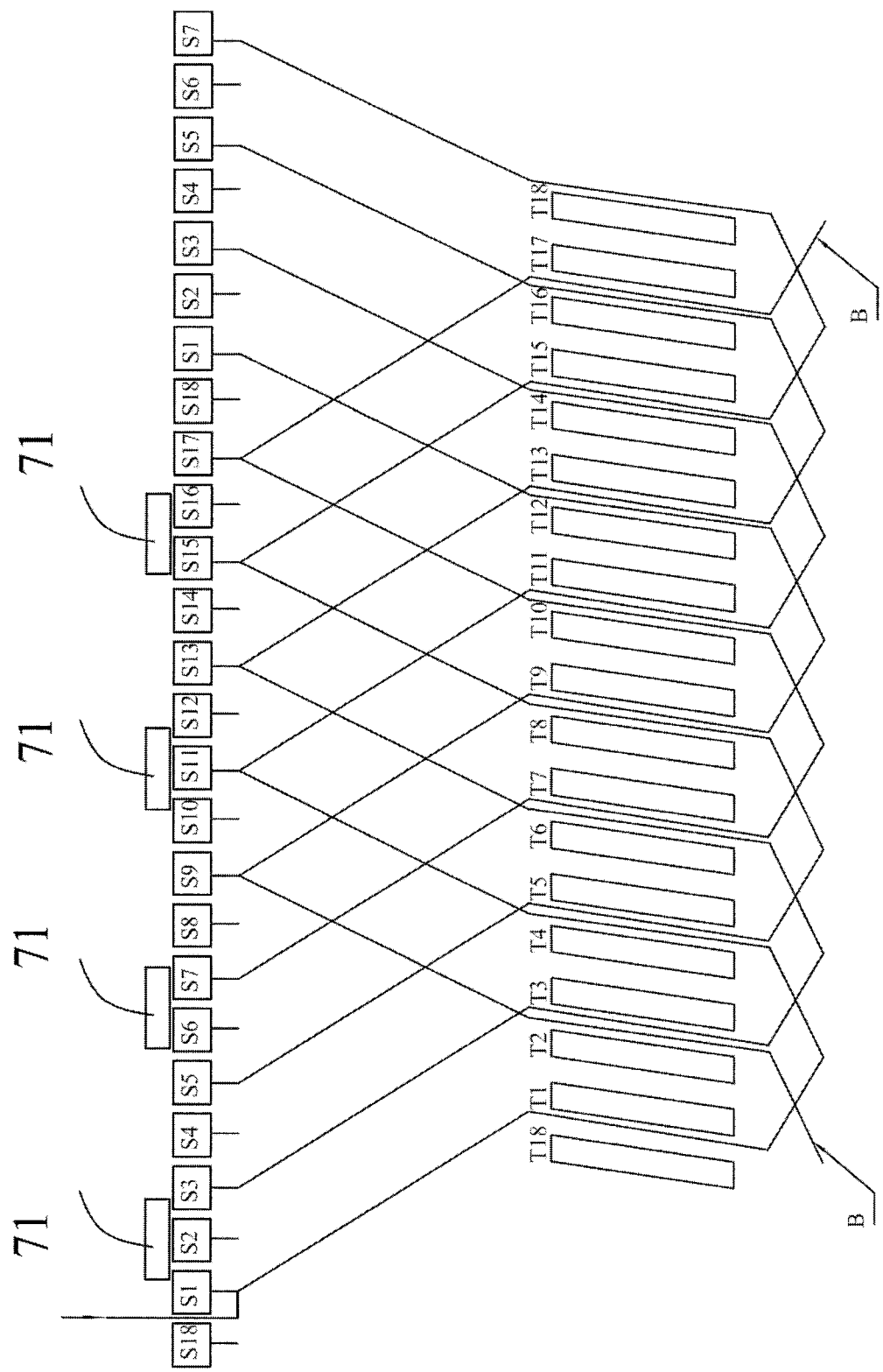
FIG. 7 is a view showing the winding process of all first winding elements of the rotor winding of FIG. 6.
Figure 8:
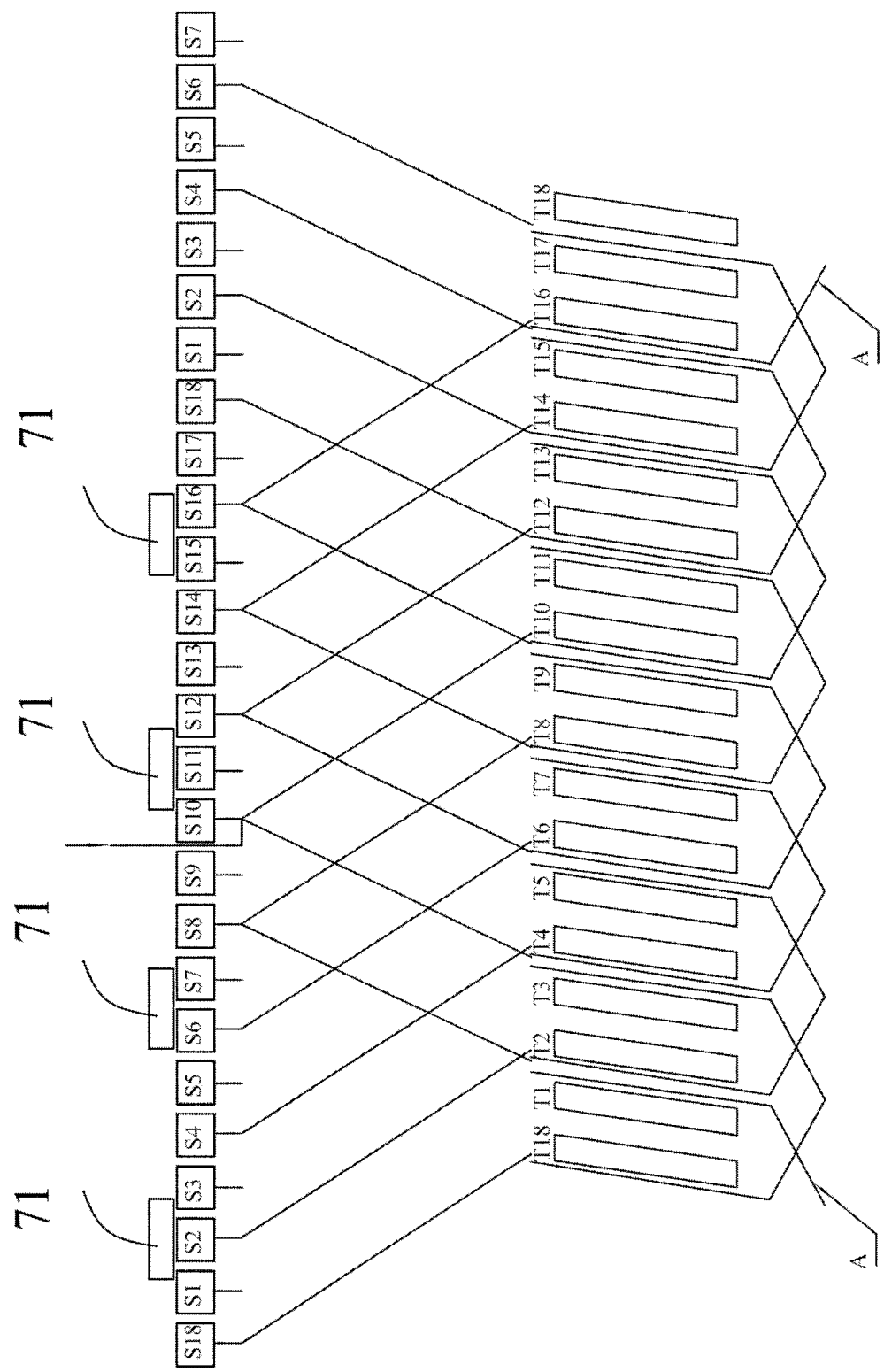
FIG. 8 is a view showing the winding process of all second winding elements of the rotor winding of FIG. 6.

FIG. 6 to FIG. 8 are unrolled views of a rotor winding of a motor according a second embodiment of the present invention. FIG. 6 is an unrolled view of the whole rotor winding, and FIG. 7 and FIG. 8 are unrolled views of portions of the rotor winding disposed in the odd-numbered wire slots and in the even-numbered wire slots, respectively.

The motor includes four stator poles, the commutator includes eighteen commutator segments S1 to S18, and the rotor core includes eighteen teeth T1 to T18, thus forming eighteen wire slots. Therefore, the motor pole pitch is 4.5 wire slots, or 4.5 teeth, or 4.5 commutator segments.

For ease of description, the reference numbers of the teeth at the right sides of the wire slots are likewise used as the reference numbers of the wire slots. The rotor winding is likewise formed by winding two wires. The winding and hooking of one wire is as follows.

TABLE 5

Winding and Hooking of The First Wire

| Commutator Segment (Hooked) | Group of Teeth Being Wound | Commutator Segment (Hooked) | Group of Teeth Being Wound | Commutator Segment (Hooked) |
|---|---|---|---|---|
| S1 | T1~T4 | S11 | T11~T14 | S3 |
| S3 | T3~T6 | S13 | T13~T16 | S5 |
| S5 | T5~T8 | S15 | T15~T18 | S7 |
| S7 | T7~T10 | S17 | T17~T2 | S9 |
| S9 | T9~T12 | S1 | | |

The winding and hooking of the other wire is as follows.

TABLE 6

Winding and Hooking of The Second Wire

| Commutator Segment (Hooked) | Group of Teeth Being Wound | Commutator Segment (Hooked) | Group of Teeth Being Wound | Commutator Segment (Hooked) |
|---|---|---|---|---|
| S10 | T10~T13 | S2 | T2~T5 | S12 |
| S12 | T12~T15 | S4 | T4~T7 | S14 |
| S14 | T14~T17 | S6 | T6~T9 | S16 |
| S16 | T16~T1 | S8 | T8~T11 | S18 |
| S18 | T18~T3 | S10 | | |

In summary, in this embodiment, the rotor winding has eighteen winding elements, and the number of the winding elements is the same as the number of the commutator segments or the teeth. All winding elements disposed in the odd-numbered wire slots are connected in series directly or physically through only the commutator segments to form a closed loop. Preferably, all winding elements disposed in the odd-numbered wire slots are formed by continuously winding the first wire. All winding elements disposed in the even-numbered wire slots are connected in series directly or physically through only the commutator segments to form a closed loop. Preferably, all winding elements disposed in the even-numbered wire slots are formed by continuously winding the second wire.

Of the eighteen winding elements, each winding element extends around four teeth (or four wire slots). Therefore, if calculated in terms of the tooth number or the wire slot number, each winding element has a span length of 4, which is 0.5 less than the pole pitch. The difference between the span length and the pole pitch is no greater than 1. The commutator pitch of each winding element is 10 or 8 (calculated in two circumferential directions of the commutator). For example, the commutator pitch of the winding element that is hooked on the commutator segments S1 and S11 is 10 or 8, which is 1 greater or less than two times of the pole pitch.

Figure 9:
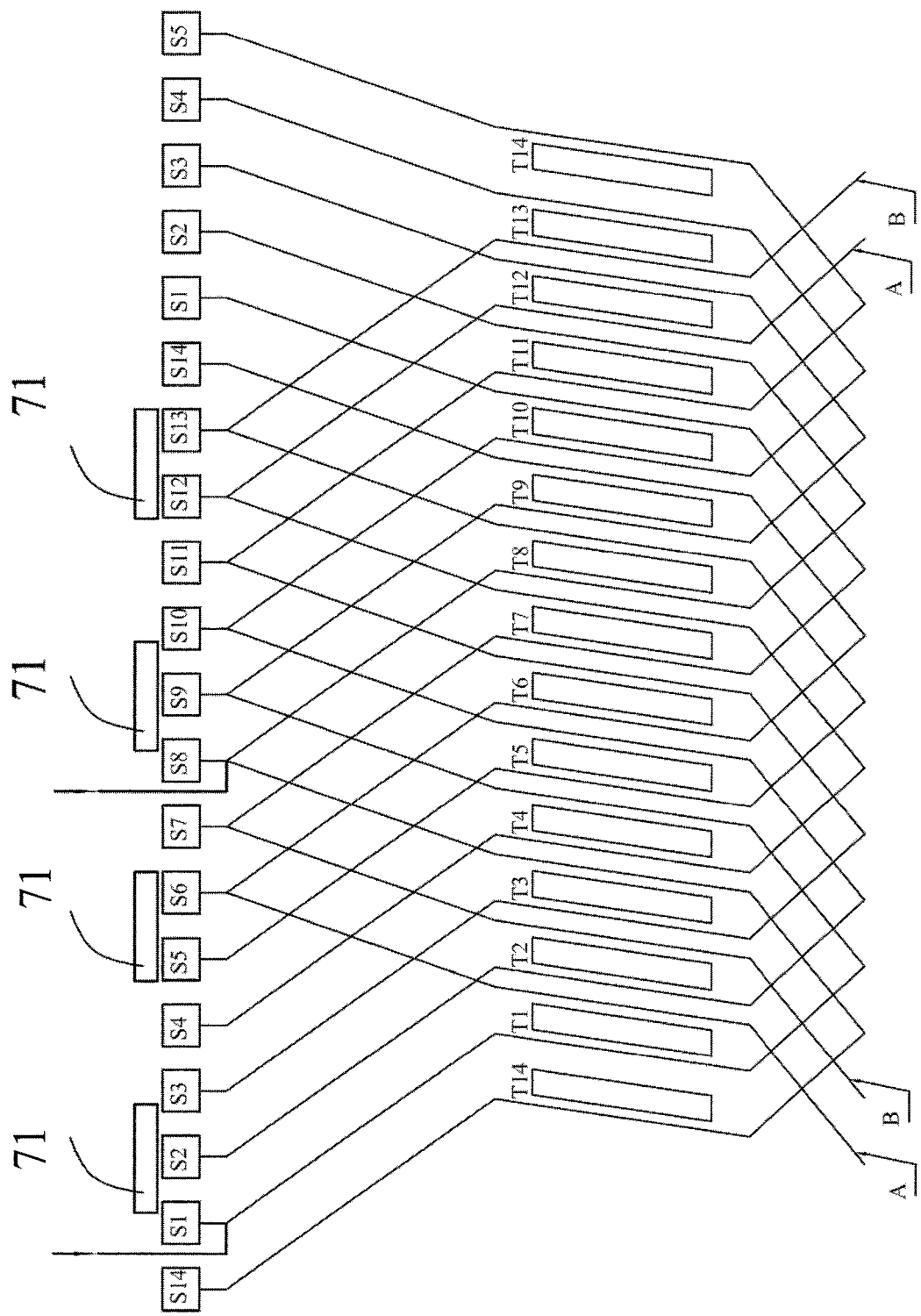
FIG. 9 is an unrolled view of a rotor winding of a motor according to a second embodiment of the present invention.
Figure 10:
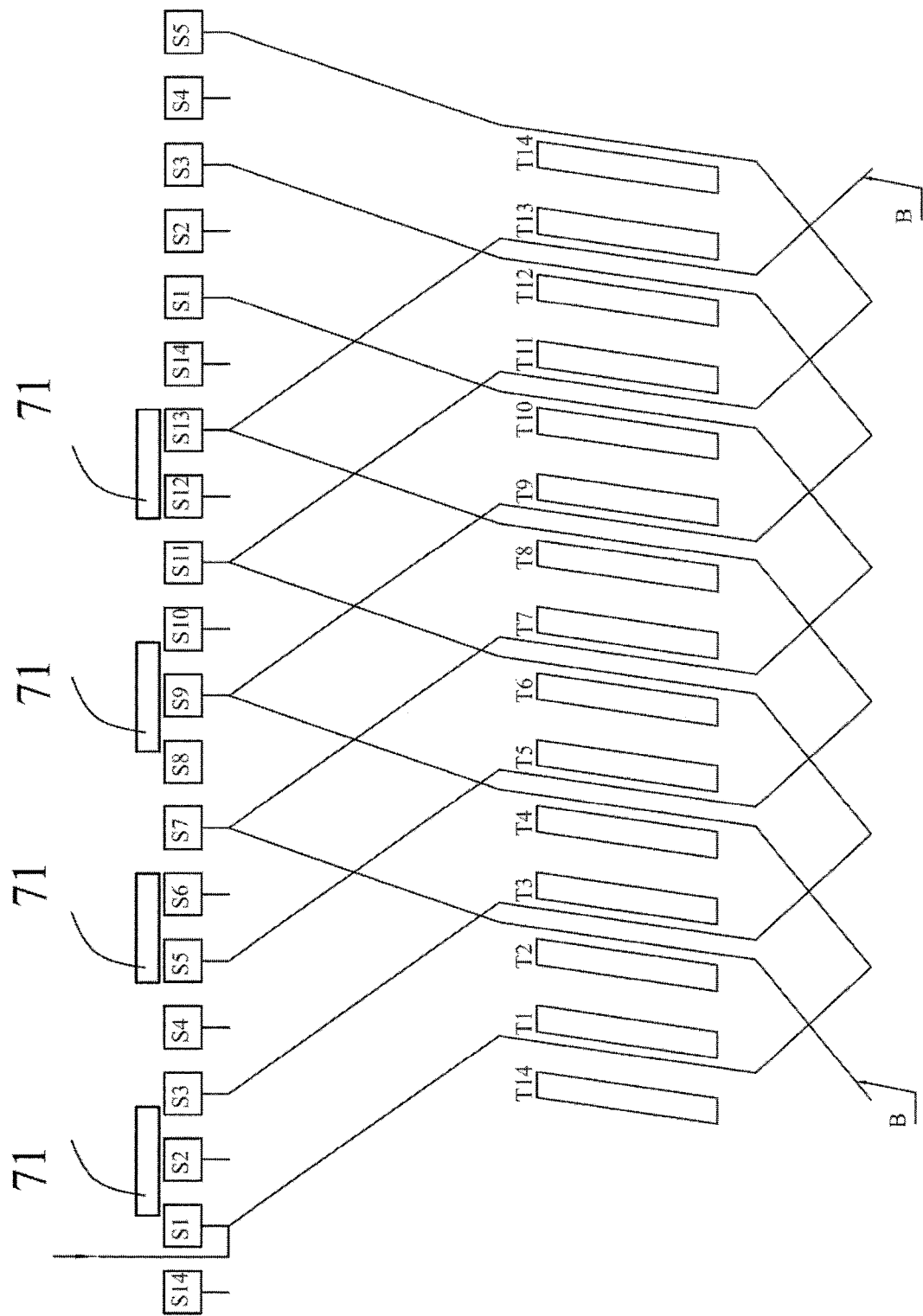
FIG. 10 is a view showing the winding process of all first winding elements of the rotor winding of FIG. 9.
Figure 11:
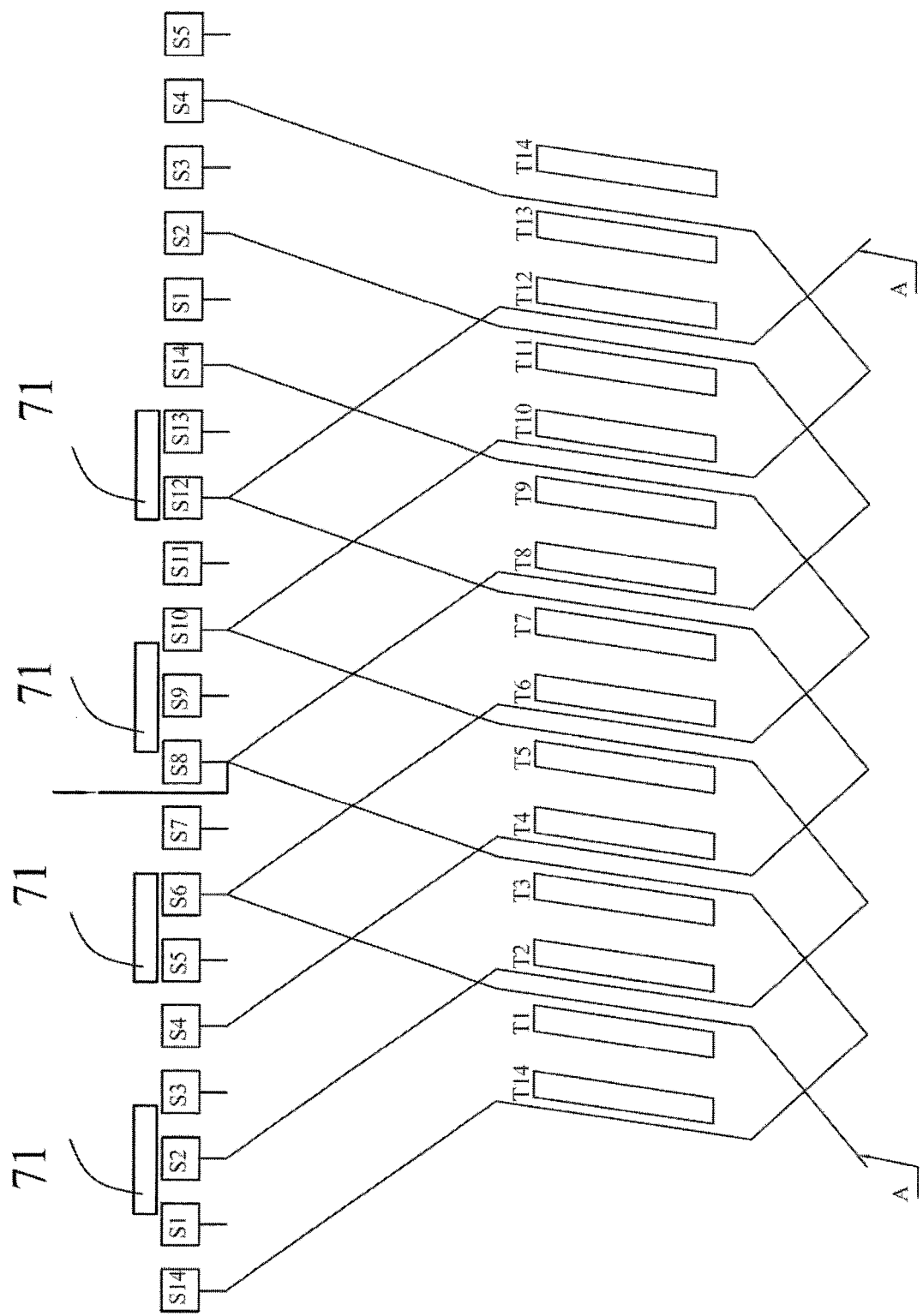
FIG. 11 is a view showing the winding process of all second winding elements of the rotor winding of FIG. 9.

FIG. 9 to FIG. 11 are unrolled views of a rotor winding of a motor according a third embodiment of the present invention. FIG. 9 is an unrolled view of the whole rotor winding, and FIG. 10 and FIG. 11 are unrolled views of portions of the rotor winding disposed in the odd-numbered wire slots and in the even-numbered wire slots, respectively.

The motor includes four stator poles, the commutator includes fourteen commutator segments S1 to S14, and the rotor core includes fourteen teeth T1 to T14, thus forming fourteen wire slots. Therefore, the motor pole pitch is 3.5 wire slots, or 3.5 teeth, or 3.5 commutator segments.

For ease of description, the reference numbers of the teeth at the right sides of the wire slots are likewise used as the reference numbers of the wire slots. The rotor winding is likewise formed by winding two wires. The winding and hooking of one wire is as follows.

TABLE 7

Winding and Hooking of The First Wire

| Commutator Segment (Hooked) | Group of Teeth Being Wound | Commutator Segment (Hooked) | Group of Teeth Being Wound | Commutator Segment (Hooked) |
|---|---|---|---|---|
| S1 | T1~T4 | S9 | T9~T12 | S3 |
| S3 | T3~T6 | S11 | T11~T14 | S5 |
| S5 | T5~T8 | S13 | T13~T2 | S7 |
| S7 | T7~T10 | S1 | | |

The winding and hooking of the other wire is as follows.

TABLE 8

Winding and Hooking of The Second Wire

| Commutator Segment (Hooked) | Group of Teeth Being Wound | Commutator Segment (Hooked) | Group of Teeth Being Wound | Commutator Segment (Hooked) |
|---|---|---|---|---|
| S8 | T8~T11 | S2 | T2~T5 | S10 |
| S10 | T10~T13 | S4 | T4~T7 | S12 |
| S12 | T12~T1 | S6 | T6~T9 | S14 |
| S14 | T14~T3 | S8 | | |

In summary, in this embodiment, the rotor winding has fourteen winding elements, and the number of the winding elements is the same as the number of the commutator segments or the teeth. All winding elements disposed in the odd-numbered wire slots are connected in series directly or physically through only the commutator segments to form a closed loop. Preferably, all winding elements disposed in the odd-numbered wire slots are formed by continuously winding the first wire. All winding elements disposed in the even-numbered wire slots are connected in series directly or physically through only the commutator segments to form a closed loop. Preferably, all winding elements disposed in the even-numbered wire slots are formed by continuously winding the second wire.

Of the fourteen winding elements, each winding element extends around four teeth (or four wire slots). Therefore, if calculated in terms of the tooth number or the wire slot number, each winding element has a span length of 4, which is 0.5 less than the pole pitch. The difference between the span length and the pole pitch is no greater than 1. The commutator pitch of each winding element is 8 or 6 (calculated in two circumferential directions of the commutator). For example, the commutator pitch of the winding element that is hooked on the commutator segments S1 and S9 is 8 or 6, which is 1 greater or less than two times of the pole pitch.

Figure 12:
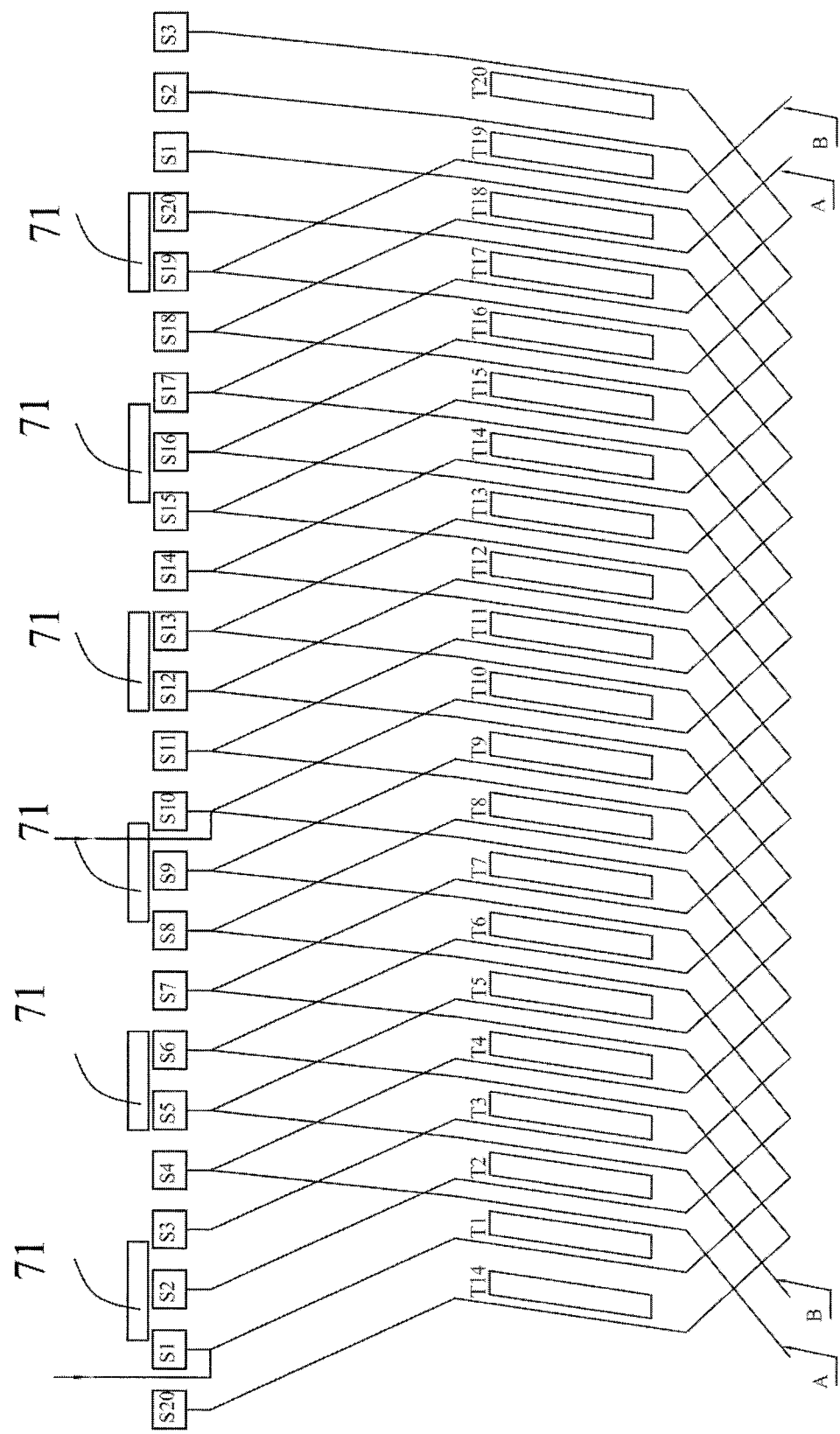
FIG. 12 is an unrolled view of a rotor winding of a motor according to a second embodiment of the present invention.
Figure 13:
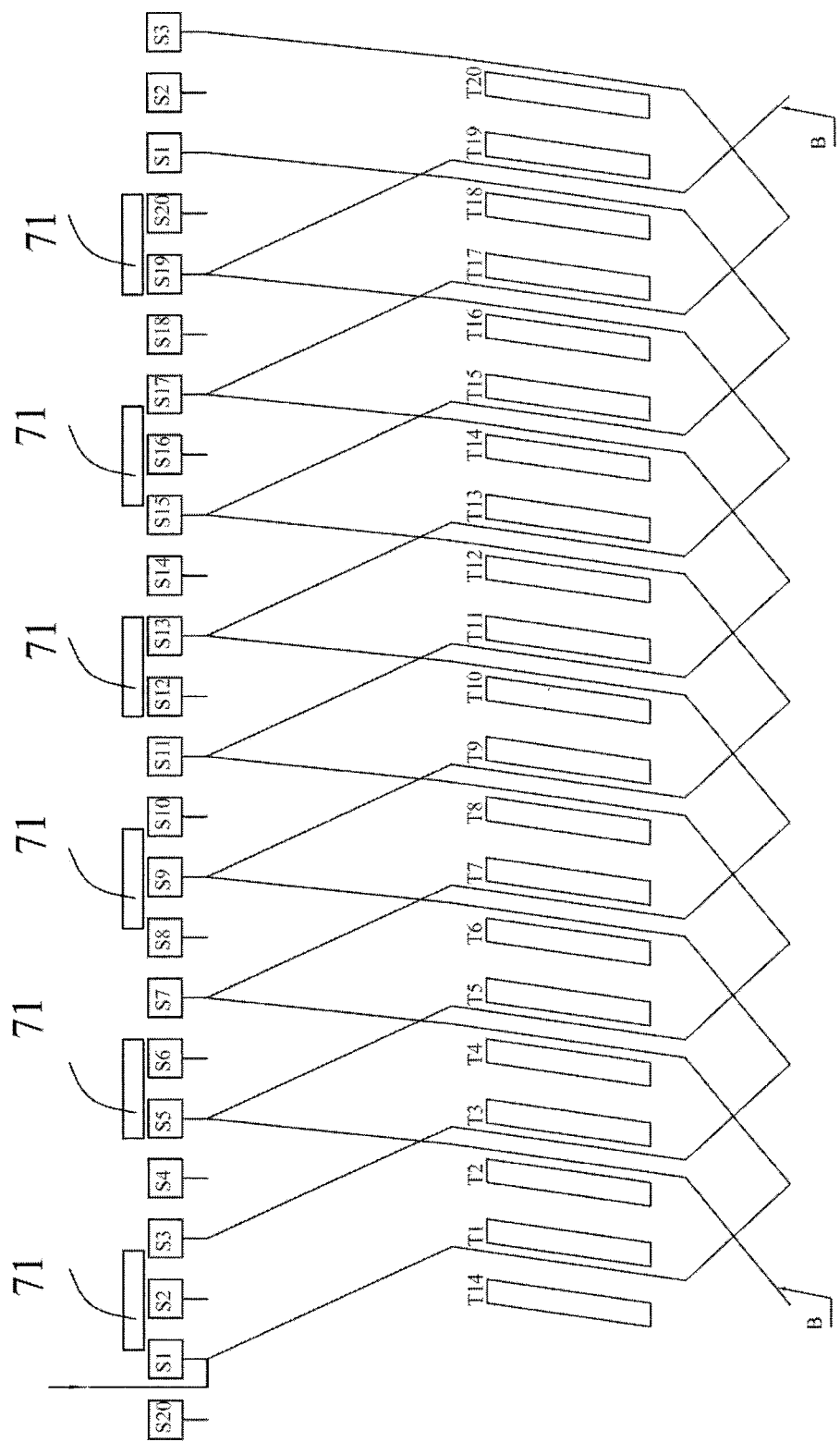
FIG. 13 is a view showing the winding process of all first winding elements of the rotor winding of FIG. 12.
Figure 14:
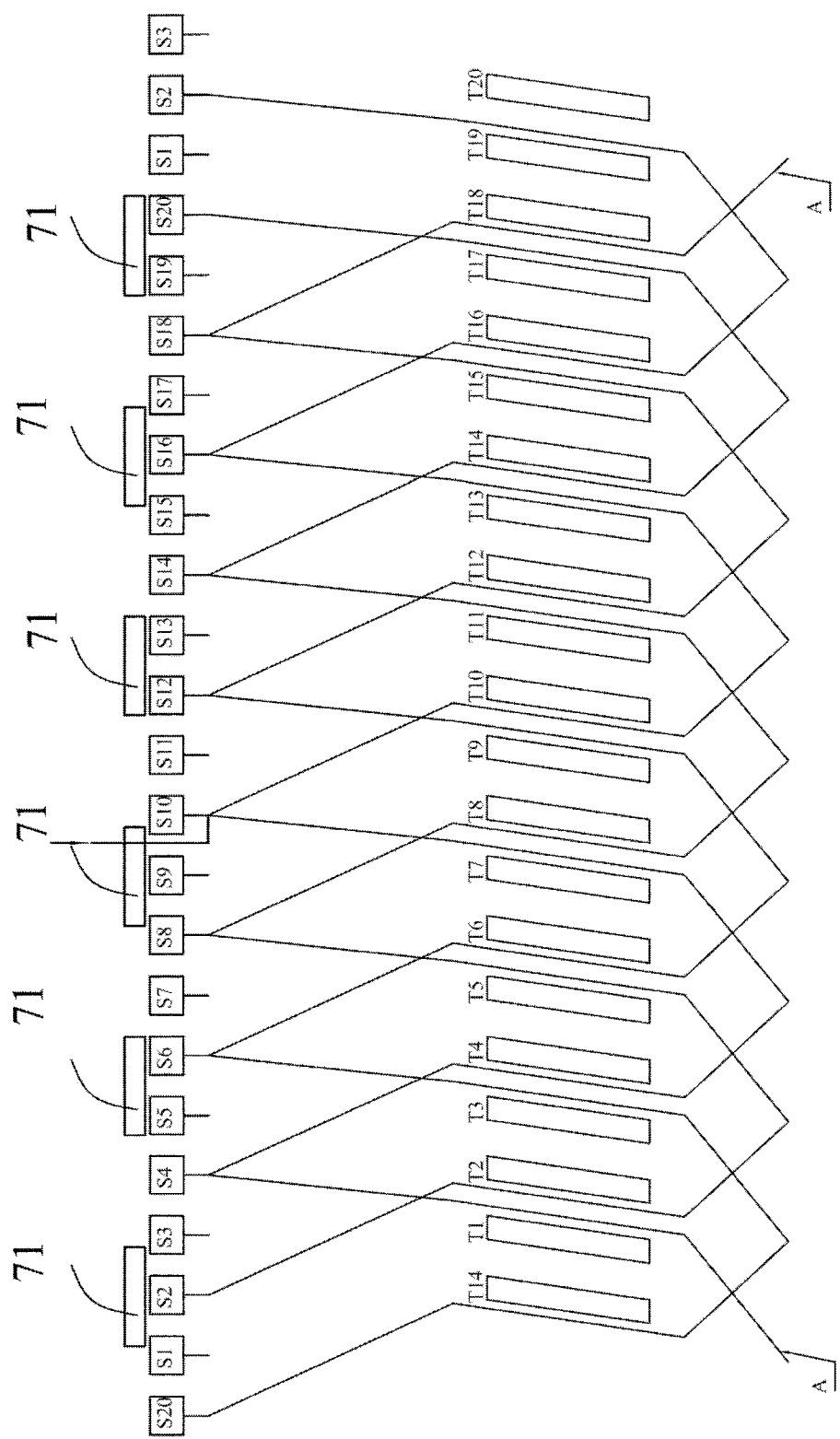
FIG. 14 is a view showing the winding process of all second winding elements of the rotor winding of FIG. 12.

FIG. 12 to FIG. 14 are unrolled views of a rotor winding of a motor according a fourth embodiment of the present invention. FIG. 9 is an unrolled view of the whole rotor winding, and FIG. 10 and FIG. 11 are unrolled views of portions of the rotor winding disposed in the odd-numbered wire slots and in the even-numbered wire slots, respectively.

The motor includes six stator poles, the commutator includes twenty commutator segments S1 to S20, and the rotor core includes twenty teeth T1 to T20, thus forming twenty wire slots. Therefore, the motor pole pitch is 20/6, which is rounded to about 3.3 wire slots, or 3.3 teeth, or 3.3 commutator segments.

For ease of description, the reference numbers of the teeth at the right sides of the wire slots are likewise used as the reference numbers of the wire slots. The rotor winding is likewise formed by winding two wires. The winding and hooking of one wire is as follows.

TABLE 9

Winding and Hooking of The First Wire

| Commutator Segment (Hooked) | Group of Teeth Being Wound | Commutator Segment (Hooked) | Group of Teeth Being Wound | Commutator Segment (Hooked) |
|---|---|---|---|---|
| S1 | T1~T4 | S7 | T7~T10 | S13 |
| S13 | T13~T16 | S19 | T19~T2 | S5 |
| S5 | T5~T8 | S11 | T11~T14 | S17 |
| S17 | T17~T20 | S3 | T3~T6 | S9 |
| S9 | T9~T12 | S15 | T15~T18 | S1 |

The winding and hooking of the other wire is as follows.

TABLE 10

Winding and Hooking of The Second Wire

| Commutator Segment (Hooked) | Group of Teeth Being Wound | Commutator Segment (Hooked) | Group of Teeth Being Wound | Commutator Segment (Hooked) |
|---|---|---|---|---|
| S10 | T10~T13 | S16 | T16~T19 | S2 |
| S2 | T2~T5 | S8 | T8~T11 | S14 |
| S14 | T14~T17 | S20 | T14~T3 | S6 |
| S6 | T6~T9 | S12 | T12~T15 | S18 |
| S18 | T18~T1 | S4 | T4~T7 | S10 |

In summary, in this embodiment, the rotor winding has twenty winding elements, and the number of the winding elements is the same as the number of the commutator segments or the teeth. All winding elements disposed in the odd-numbered wire slots are connected in series directly or physically through only the commutator segments to form a closed loop. Preferably, all winding elements disposed in the odd-numbered wire slots are formed by continuously winding the first wire. All winding elements disposed in the even-numbered wire slots are connected in series directly or physically through only the commutator segments to form a closed loop. Preferably, all winding elements disposed in the even-numbered wire slots are formed by continuously winding the second wire.

Of the twenty winding elements, each winding element extends around four teeth (or four wire slots). Therefore, if calculated in terms of the tooth number or the wire slot number, each winding element has a span length of 4, which is 0.7 less than the pole pitch. The difference between the span length and the pole pitch is no greater than 1. The commutator pitch of each winding element is 6 or 14 (calculated in two circumferential directions of the commutator). For example, the commutator pitch of the winding element that is hooked on the commutator segments S1 and S7 is 6 or 14, which is 0.6 less than or 0.8 greater than four times of the pole pitch.

Figure 15:
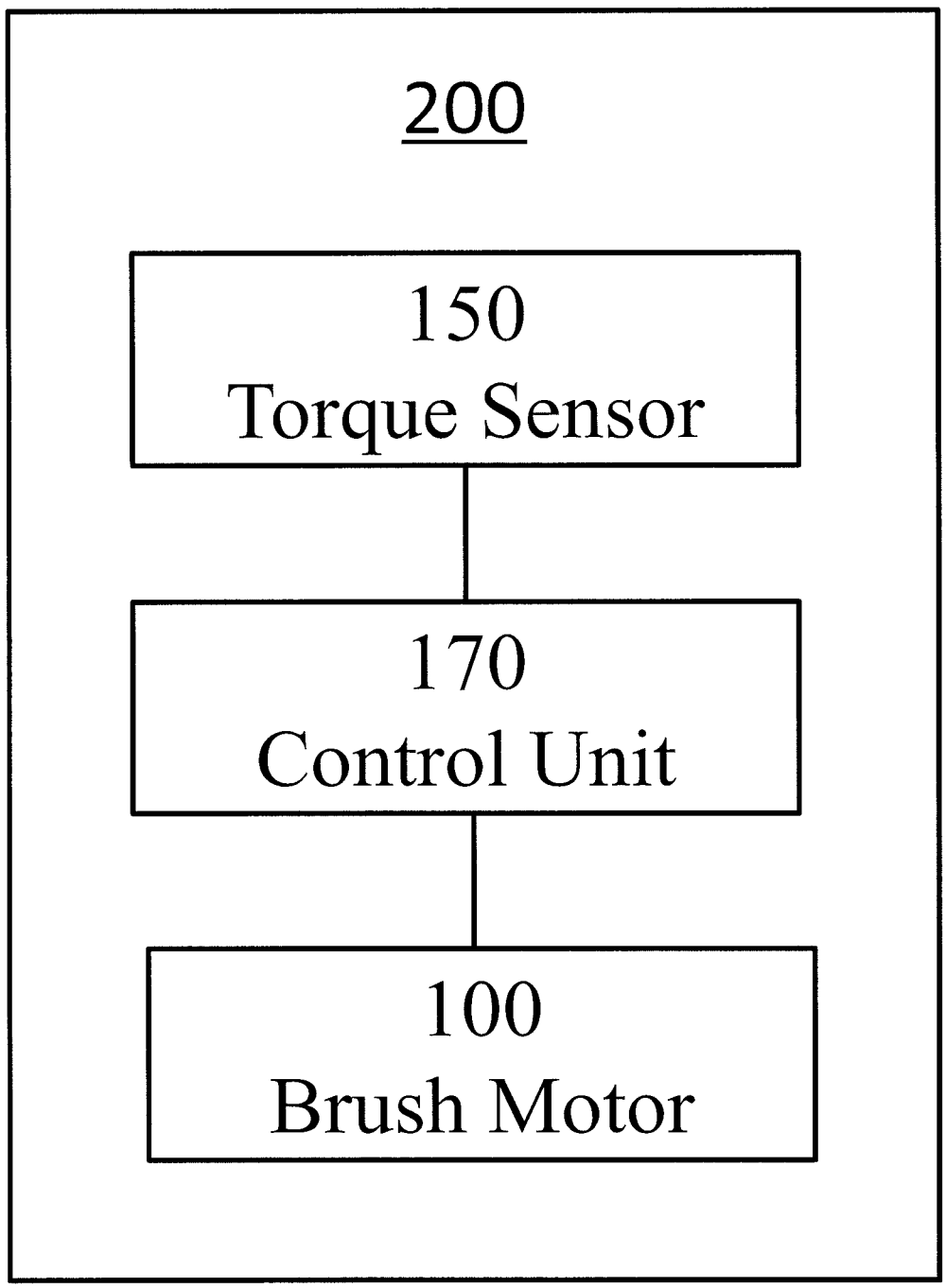
FIG. 15 illustrates an electric power steering system according to an embodiment of the present invention.

Referring to FIG. 15, an electric power steering system 200 according to the present invention is illustrated. The electric power steering system 200 includes a torque sensor 150, an electronic control unit 170, and a brush motor 100. The electronic control unit 170 is connected with the torque sensor 150, and the brush motor 100 is used as an assisting motor under the control of the electronic control unit 170. The use of the brush motor 100 of the present invention can greatly enhance the reliability of the electric power steering system 200.

Although the invention is described with reference to one or more embodiments, the above description of the embodiments is used only to enable people skilled in the art to practice or use the invention. It should be appreciated by those skilled in the art that various modifications are possible without departing from the spirit or scope of the present invention. The embodiments illustrated herein should not be interpreted as limits to the present invention, and the scope of the invention is to be determined by reference to the claims that follow.

The invention claimed is:

1. A brush motor comprising:
a stator comprising a plurality of electric brushes; and
a rotor rotatably mounted to the stator, the rotor comprising:
a rotary shaft,
a commutator and a rotor core fixed to the rotary shaft, the commutator comprising a plurality of commutator segments, the electric brushes configured to be in contacting with at least some of the commutator segments, the rotor core comprising a plurality of teeth, adjacent teeth defining therebetween wire slots; and
a rotor winding wound around the rotor core and comprising a plurality of winding elements, the winding elements comprising a plurality of first winding elements and a plurality of second winding elements received in the wire slots, the first winding elements being connected in series through the commutator segments to form a first closed loop, the second winding elements being connected in series through the commutator segments to form a second closed loop, the first closed loop be not electrically connected with the second closed loop when the electric brush being not contacting with the commutator segments, and the first winding elements and the second winding elements being received in different wire slots.

2. The brush motor according to claim 1, wherein for any two adjacent wire slots, one wire slot is configured to receive one of the first winding elements, and the other wire slot is configured to receive one of the second winding elements.

3. The brush motor according to claim 1, wherein for any two adjacent commutator segments, one commutator segment is electrically connected with one of the first winding elements, and the other commutator segment is electrically connected with one of the second winding elements.

4. The brush motor according to claim 3, wherein the first winding elements are formed by continuously winding a single wire, and the second winding elements are formed by continuously winding a single wire.

5. The brush motor according to claim 3, wherein the number of the commutator segments of the commutator is an even number, and the number of the teeth of the rotor core is an even number.

6. The brush motor according to claim 5, wherein the number of the commutator segments is equal to the number of the teeth.

7. The brush motor according to claim 5, wherein a span length of the winding element is an even number.

8. The brush motor according to claim 5, wherein in various winding elements formed by winding the same wire, adjacent ones are offset by two wire slots along a circumferential direction of the rotor and by two commutator segments along the circumferential direction of the rotor.

9. The brush motor according to claim 1, wherein a difference between a span length of each winding element and a pole pitch calculated in terms of the number of the teeth of the rotor is no greater than 1, and two leading-out ends of each winding element are directly connected to two of the commutator segments, respectively.

10. The brush motor according to claim 1, wherein two leading-out ends of each winding element are directly connected to two of the commutator segments, and a difference between a commutator pitch of each winding element and two times of a pole pitch calculated in terms of the number of the commutator segments is no greater than 2.

11. The brush motor according to claim 10, wherein the difference between the commutator pitch of each winding element and two times of the pole pitch calculated in terms of the number of the commutator segments is equal to 1.

12. The brush motor according to claim 1, wherein the commutator segments are evenly arranged along a circumferential direction of the commutator, with a spacing formed between adjacent two commutator segments, a size of each electric brush in a circumferential direction of the commutator is configured to enable the electric brush to at least contact two adjacent commutator segments at any given time.

13. The brush motor according to claim 1, wherein the number of the stator poles of the stator, the number of the commutator segments and the number of the wire slots of the rotor are one of the following combinations:
   the stator has 4 stator poles, the number of the commutator segments is 22, and the number of the wire slots is 22;
   the stator has 4 stator poles, the number of the commutator segments is 18, and the number of the wire slots is 18;
   the stator has 4 stator poles, the number of the commutator segments is 14, and the number of the wire slots is 14; and
   the stator has 6 stator poles, the number of the commutator segments is 20, and the number of the wire slots is 20.

14. An electric power steering system comprising:
a torque sensor;
an electronic control unit connected to the torque sensor; and
a brush motor configured as an assisting motor under the control of the electronic control unit, the brush motor comprising:
   a stator; and
   a rotor rotatably mounted to the stator, the rotor comprising:
      a rotary shaft,
      a commutator and a rotor core fixed to the rotary shaft, the commutator comprising a plurality of commutator segments, the rotor core comprising a plurality of teeth, adjacent teeth defining therebetween wire slots; and
      a rotor winding wound around the rotor core and comprising a plurality of winding elements, the winding elements comprising a plurality of first winding elements and a plurality of second winding elements received in the wire slots, the first winding elements being connected in series through the commutator segments to form a first closed loop, the second winding elements being connected in series through the commutator segments to form a second closed loop, and the first winding elements and the second winding elements being received in different wire slots.

15. The electric power steering system according to claim 14, wherein each of the first winding elements is not electrically connected with any of the second winding elements when the electric brush is not contacting with the commutator segments.

* * * * *